United States Patent [19]

Herrmann et al.

[11] 4,206,474
[45] Jun. 3, 1980

[54] LOW-PASS FILTER WITH REMOTELY CONTROLLABLE RISE TIME

[75] Inventors: Donald C. Herrmann, Hartsville, Pa.; Lucas J. Bazin, Vincentown, N.J.

[73] Assignee: RCA Corporation, New York, N.Y.

[21] Appl. No.: 938,245

[22] Filed: Aug. 30, 1978

[51] Int. Cl.² .................. H04N 5/22; H03H 9/00; H03B 1/00
[52] U.S. Cl. ................................ 358/22; 358/183; 333/174; 328/167
[58] Field of Search ............... 328/167; 307/268, 358; 358/22, 160, 167, 181, 182, 183, 194, 166; 333/174

[56] References Cited

U.S. PATENT DOCUMENTS

| | | |
|---|---|---|
| 3,560,638 | 2/1971 | Skydstrup et al. ............ 358/22 |
| 3,970,774 | 7/1976 | Bazin et al. .................. 358/160 |

*Primary Examiner*—John C. Martin
*Assistant Examiner*—Aristotelis M. Psitos
*Attorney, Agent, or Firm*—Eugene M. Whitacre; Paul J. Rasmussen; Robert L. Troike

[57] ABSTRACT

A remotely controlled chroma key soft edger is described for use with an analog switcher. The keying signal is a low passed filtered and differentially summed with substantially an unfiltered keying signal and the resultant high frequency components are summed with the low pass filtered signal. The gain of the peaking signal is remotely controlled to adjust the summed rise time of the keying signal.

4 Claims, 3 Drawing Figures

LOW-PASS FILTER WITH REMOTELY CONTROLLABLE RISE TIME

BACKGROUND OF THE INVENTION

This invention relates to a variable low pass filter which is remotely controllable and more particularly to a chroma key soft edger.

In a chroma keying system, the red, green and blue video signals from a camera are received by a chroma keyer which in response to a particular color signal provides a relatively high amplitude keying signal which exceeds a given threshold level. When a special effects device receives this keying signal, the device causes an electronic switch to switch from one camera to a different camera for the duration of that keying signal. It has been found that if this keying signal switches the electronic switch too rapidly, the rapid change in video causes bearing and noise generating effects which are undesirable. Broadcasters and users of such equipment are requesting some form of more gradual switching from one camera to the other so as to prevent these beating and noise effects. Since this switch which is switching the cameras may be located at a point remote from the controller, it is also desirable to have the control signal processing means be remotely controlled in order for the operator in the studio control room to vary the switching time for special effects and for eliminating the beating noise effects. It is therefore desirable that the chroma control signal which is going to control the switcher have a variable rise time which is selectable from a remote location.

SUMMARY OF THE INVENTION

Briefly, a remotely controllable low pass filter system is provided for selectively and remotely varying the rise time of a control signal such as used to control an analog switcher. The system includes a low pass filter and adjustable means for differentially summing the low pass filtered signal and an unfiltered signal for providing a peaking signal that contains only the high frequency components. The peaking signal and the low pass filtered signals are summed to provide the desired filtered control signal. The gain of the differential summing means is adjusted remotely to vary the peaking signal level to thereby control the rise time of the control signal.

DESCRIPTION OF THE INVENTION

Figure 1:
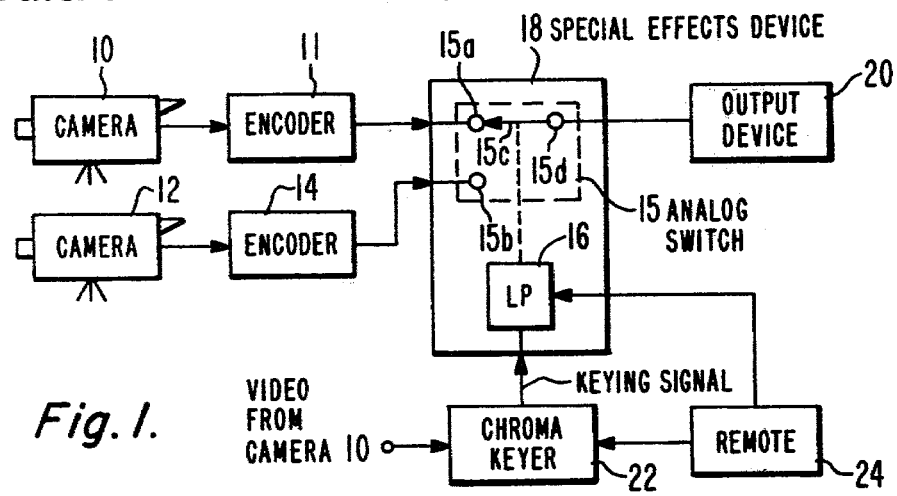
FIG. 1 is a block diagram of the chroma keying system.

Referring to FIG. 1, there is illustrated a chroma keying system. The signals from camera 10 for example are encoded in encoder 11 and applied to terminal 15a of a switcher 15 of special effects device 18. The camera signals from another source camera 12 are applied via encoder 14 to another terminal 15b of switcher 15 of device 18. The signal at the switcher 15 is applied via switch arm 15c and terminal 15d to the output device 20. A chroma keyer 22 responsive to signals for example from camera 10 provides a keying signal at a selected color from camera 10. The keyer 22 is responsive to control voltages for example from remote unit 24 for selecting that particular chroma signal at which an output exceeds threshold and provides a signal to the special effects device 18. For a description of a particular remote controlled chroma keyer see applicants' application (RCA 72,885), entitled "Chroma Keying Selector System" filed on even date herewith. The switcher 15 in the special effects device 18 is responsive to signals via a low pass filter 16 according to the present invention for switching the signals from camera 10 to camera 12. The scene viewed by camera 10 for example may include a background which is of the particular chroma selected by the remote unit 24 in the chroma keyer 22 to cause the switch 15 to couple the signals from camera 12 when the scene scanned by camera 10 reaches the color of that background.

Figure 2:
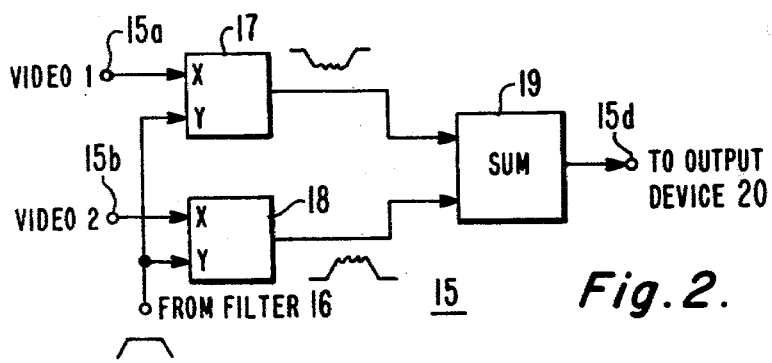
FIG. 2 is a block diagram of the analog switch in FIG. 1.

According to the present invention, a low pass filter 16 is responsive to the chroma key signal for providing a soft edger so as to cause the switch 15 to move to the position to couple the signals from camera 12 over a given time period determined by the low pass filter 16. By softening the edge of transitions from the signals from camera 10 to camera 12 and back, the beating and noise effects are eliminated. A variable D.C. control voltage from the remote control unit 24 to the low pass filter 16 provides an adjustable voltage to the low pass filter 16 to change the rise time characteristic of the keying signal applied to the analog switch 15. The switch 15 is not a simple toggle switch as represented in FIG. 1. The switch is an analog switching device in which the time period for switching from camera 10 to camera 12 is delayed in proportion to the rise time of the output of filter 16. The analog switch 15 is preferably operated such that the video from camera 10 is faded as the input of camera 12 is added in proportion to the rise time of the signal from filter 16. The analog switch 15 may be like that illustrated in FIG. 2 using 4-quadrant multipliers 17 and 18 and summer 19. The video (video 1) from camera 10 is applied to x input of multiplier 17 and the video (video 2) from camera 12 is applied to the x input of multiplier 18. The keying signal is applied to the Y input terminal of both multipliers 17 and 18. As the keying voltage rises for example the video from camera 10 falls and the video from camera 12 increases. The video is summed at the summer 19. Between switching positions video from both cameras is applied in proportion to the rise or fall time of the keying signal. At the midpoint of the rise time equal signal levels are provided from both cameras.

Figure 3:
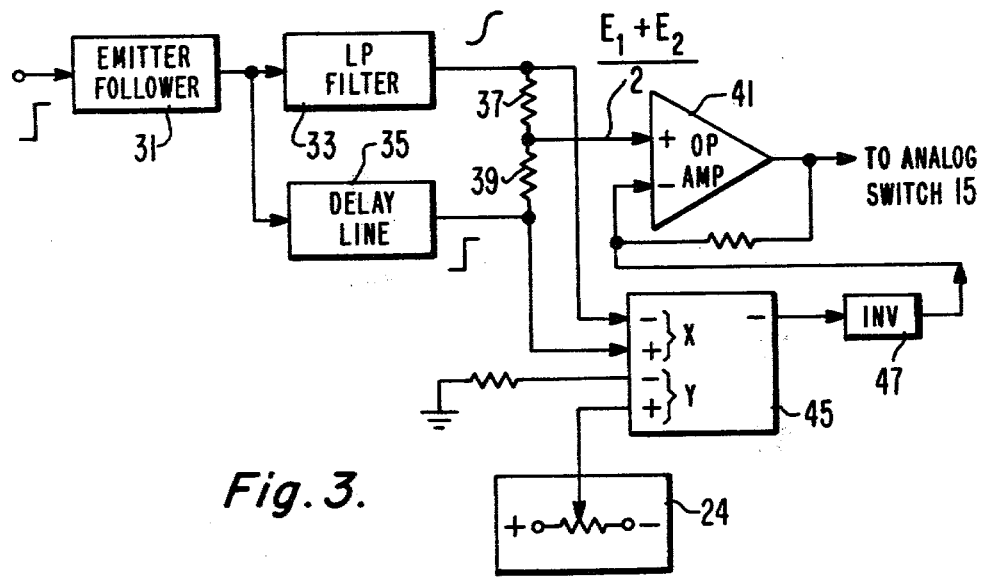
FIG. 3 is a block diagram of the low pass filter in FIG. 1 according to the present invention.

Referring to adjustable low pass filter 16 in FIG. 3, the chroma keying signals exceeding the threshold in the chroma keyer 22 are coupled via isolating emitter follower 31 to a low pass filter 33 and to a delay line 35. The output of the delay line 35 is such that the signal has full band width (not band width limited in the delay) and is delayed an amount equal to the delay from the low pass filter 33, which may be, for example, a 2-stage low pass active filter. The filter 33 provides a rise time of the signal that is selected to be the maximum desired rise time. A resistor divider network of equal valued resistors 37 and 39 is coupled between the outputs of low pass filter 33 and delay line 35. The junction of resistors 37 and 39 is coupled to the + input terminal of operational amplifier 41. The output of low pass filter 33 is also coupled to the −x input of a 4-quadrant multiplier 45. The output of delay line 35 is coupled to the +x terminal of multiplier 45. The −Y input of multiplier 34 is coupled to ground or a reference potential. The +Y input terminal of multiplier 45 is coupled to the remote unit 24. At the remote unit 24 is located a + and −DC source of potential and the D.C. voltage to the +Y terminal is varied from + to −. The output from the multiplier 45 contains just the high frequency information only or the high frequency difference signal from the low pass filter 33 and the delay line 35. By varying the D.C. voltage from + to − to the +Y input of multiplier 45 the output level or the gain and the phase of the high frequency signal is varied. The signal from the output of multiplier 45 is inverted via inverter 47 and applied to the minus (−) input of operational amplifier 41. The high frequency adjustably varying peaking signal is added to the summed voltage (E1+E2/2) at the plus input terminal of operational amplifier 41 to form a keying control signal in which the rise and fall times vary symmetrically as a function of a remote D.C. control signal while the low frequency amplitude remains constant.

What is claimed is:

1. A variable low pass filter for selectively and remotely varying the rise time of a first signal comprising:
   a fixed low pass filter having the slowest desired rise time characteristic,
   a delay line having a substantially all pass capability for delaying an amount equal to the delay of said fixed filter,
   means for coupling said first signal to said fixed low pass filter and said delay line,
   means coupled to said fixed low pass filter and delay line for additively summing the low pass filtered signal and said delayed signal to provide a first additively summed signal,
   adjustable peaking means coupled to said fixed low pass filter and delay line for differentially summing said low passed filtered signal and delayed signal for providing a peaking signal that contains only the high frequency components, said adjustable peaking means including means responsive to control signal levels applied thereto for adjusting the amplitude level of the peaking signal,
   means for additively summing said first additively summed signal and said peaking signal for providing a processed control signal,
   remotely located control means having means for selectively providing different control signal levels,
   and means for coupling said remotely located control means to said adjustable peaking means for selectively and remotely changing the gain of said peaking signal to remotely control the rise time of said control signal.

2. The combination of claim 1 wherein said adjustable peaking means includes a 4-quadrant multiplier with one x terminal coupled to said low pass filter and the other x terminal coupled to said delay line, and one Y terminal coupled to said remotely located control means for receiving a selectable voltage therefrom.

3. In chroma keying system of the type including an analog switcher for switching between cameras or other such video source when the chroma filter passes a chroma signal above a threshold, a chroma key soft edger coupled between said analog switcher and said threshold for adjustably controlling from a remote source the rise time of the keying signal comprising:
   a low pass filter,
   a delay line having substantially an all frequency pass capability for delaying a signal applied thereto an amount equal to the delay of said low pass filter,
   means for coupling said chroma signal exceeding said threshold to said filter and said delay line,
   adjustable means coupled to said filter and delay line for differentially summing said low pass filtered signal and said delayed only signal to provide a peaking signal that contains only the high frequency components, said adjustable peaking means including means responsive to control signal levels applied thereto for adjusting the amplitude of the peaking signal,
   means coupled to said low pass filter and delay line and said peaking means for summing said signals for providing a processed control signal to the analog switcher,
   remotely located control means having means for selectively providing different control signal levels,
   and means for coupling said remotely located control means to said adjustable means for selectively and remotely changing the gain of said peaking signal and remotely controlling the rise time of said keying signal.

4. The combination of claim 3 wherein said adjustable means includes a 4-quadrant multiplier with the signals from the delay line and low pass filter coupled to the different x inputs and said control signal levels are coupled to one of the Y inputs of said multiplier.

* * * * *